(12) United States Patent
Federspiel et al.

(10) Patent No.: US 10,969,128 B2
(45) Date of Patent: Apr. 6, 2021

(54) METHOD AND APPARATUS FOR OPTIMIZING CONTROL VARIABLES TO MINIMIZE POWER CONSUMPTION OF COOLING SYSTEMS

(71) Applicant: VIGILENT CORPORATION, Oakland, CA (US)

(72) Inventors: Clifford Federspiel, El Cerrito, CA (US); Prasad Nair, Oakland, CA (US)

(73) Assignee: Vigilent Corporation, Oakland, CA (US)

( * ) Notice: Subject to any disclaimer, the term of this patent is extended or adjusted under 35 U.S.C. 154(b) by 34 days.

(21) Appl. No.: 15/503,568

(22) PCT Filed: Aug. 13, 2015

(86) PCT No.: PCT/US2015/045101
§ 371 (c)(1),
(2) Date: Feb. 13, 2017

(87) PCT Pub. No.: WO2016/025739
PCT Pub. Date: Feb. 18, 2016

(65) Prior Publication Data
US 2017/0234559 A1    Aug. 17, 2017

Related U.S. Application Data

(60) Provisional application No. 62/037,303, filed on Aug. 14, 2014.

(51) Int. Cl.
*F24F 11/00*    (2018.01)
*G06Q 50/06*    (2012.01)
(Continued)

(52) U.S. Cl.
CPC .............. *F24F 11/30* (2018.01); *F24F 11/62* (2018.01); *F24F 11/83* (2018.01); *F25B 49/02* (2013.01);
(Continued)

(58) Field of Classification Search
CPC ...... F24F 11/30; F24F 11/46; F24F 11/62–64; F24F 11/83; F24F 11/84; G05B 13/026;
(Continued)

(56) References Cited

U.S. PATENT DOCUMENTS 6,351,740 B1 *   2/2002   Rabinowitz .......... G06N 99/005
                                                                    706/22
2001/0037278 A1 *  11/2001  Messmer ............... G06Q 40/00
                                                                    705/37
(Continued)

FOREIGN PATENT DOCUMENTS

EP    2251614 A1    11/2010
KR    20-0277148 Y1    5/2002

OTHER PUBLICATIONS

PCT Search Report and Opinion, PCT/US2015/045101, 10 pages, dated Oct. 30, 2015.
(Continued)

*Primary Examiner* — M. N. Von Buhr
(74) *Attorney, Agent, or Firm* — Moser Taboada

(57) ABSTRACT

The present invention is directed to an apparatus for minimizing power consumption in a cooling system. In one embodiment, the apparatus comprises one or more processors, one or more sensors associated with one or more regulated environments and one or more chillers that regulate temperature of the one or more regulated environments and a storage device, coupled to the one or more processors, storing instructions that when executed by the one or more processors performs a method. The method comprises gath-
(Continued)

ering readings from the one or more sensors, determining a cost and power consumption associated with setting values for a plurality of control variables associated with the one or more chiller plants, selecting values for the control variables with a minimum cost as optimized control variable values and applying the optimized control variable values to the plurality of control variables to minimize power consumption of the cooling system.

20 Claims, 18 Drawing Sheets

(51) Int. Cl.
G05B 13/02 (2006.01)
F24F 11/30 (2018.01)
F25B 49/02 (2006.01)
G05B 15/02 (2006.01)
F24F 11/62 (2018.01)
F24F 11/83 (2018.01)
F25B 25/00 (2006.01)
F24F 11/63 (2018.01)
F24F 11/84 (2018.01)
F24F 11/64 (2018.01)
F24F 11/46 (2018.01)

(52) U.S. Cl.
CPC ........... G05B 13/026 (2013.01); G05B 15/02 (2013.01); G06Q 50/06 (2013.01); F24F 11/46 (2018.01); F24F 11/63 (2018.01); F24F 11/64 (2018.01); F24F 11/84 (2018.01); F25B 25/005 (2013.01); F25B 2339/047 (2013.01); F25B 2400/06 (2013.01); F25B 2500/19 (2013.01); F25B 2600/13 (2013.01); F25B 2700/15 (2013.01); F25B 2700/21161 (2013.01); F25B 2700/21171 (2013.01); G05B 2219/2642 (2013.01); Y02B 30/70 (2013.01)

(58) Field of Classification Search
CPC ........... G05B 15/02; G05B 2219/2642; G06Q 50/06; Y02B 30/745; F25B 25/005; F25B 49/02; F25B 2339/047; F25B 2400/06; F25B 2500/19; F25B 2600/13; F25B 2700/15; F25B 2700/21161; F25B 2700/21171
See application file for complete search history.

(56) References Cited

U.S. PATENT DOCUMENTS

| | | | | |
|---|---|---|---|---|
| 2001/0039525 | A1* | 11/2001 | Messmer | G06Q 40/00 705/36 R |
| 2002/0032585 | A1* | 3/2002 | Keyes | G06Q 40/00 705/4 |
| 2005/0234686 | A1* | 10/2005 | Cheng | G06F 17/12 703/2 |
| 2006/0123807 | A1 | 6/2006 | Sullivan et al. | |
| 2009/0171512 | A1* | 7/2009 | Duncan | F24F 11/62 700/300 |
| 2011/0154842 | A1 | 6/2011 | Heydari et al. | |
| 2012/0259469 | A1 | 10/2012 | Ward et al. | |
| 2013/0018513 | A1 | 1/2013 | Metselaar | |
| 2013/0125565 | A1* | 5/2013 | Erpelding | F25B 25/005 62/56 |
| 2013/0151019 | A1* | 6/2013 | Federspiel | F24F 11/00 700/276 |
| 2013/0179373 | A1 | 7/2013 | Mutchnik et al. | |
| 2014/0188295 | A1 | 7/2014 | Saito et al. | |
| 2014/0202177 | A1* | 7/2014 | Rush | F24F 3/06 62/56 |
| 2014/0374497 | A1* | 12/2014 | Nikaido | F25B 25/005 236/1 C |
| 2015/0169795 | A1* | 6/2015 | ElBsat | G06F 17/5009 703/2 |
| 2015/0178633 | A1* | 6/2015 | ElBsat | G06F 17/16 706/14 |
| 2016/0161928 | A1* | 6/2016 | Bobker | G05B 15/02 700/275 |
| 2016/0163114 | A1* | 6/2016 | Arrigoni | G06T 19/20 345/419 |
| 2017/0090438 | A1* | 3/2017 | Liu | G05B 15/02 |

OTHER PUBLICATIONS

Zhao et al., "An Energy Management System for Building Structures Using a Multi-Agent Decision-Making Control Methodology", IEEE Transactions on Industry Applications, vol. 49, Issue 1, pp. 322-330, Jan. 1, 2013.
Supplementary European Search Report dated Mar. 6, 2018 for Application No. 15832508.

* cited by examiner

METHOD AND APPARATUS FOR OPTIMIZING CONTROL VARIABLES TO MINIMIZE POWER CONSUMPTION OF COOLING SYSTEMS

BACKGROUND OF THE INVENTION

Field of the Invention

Embodiments of the present invention generally relate to minimizing power consumption and, more particularly, to a method and apparatus for optimizing control variables to minimize power consumption of cooling systems.

Description of the Related Art

Cooling systems tend to consume a large amount of energy, yet many systems rely on sub-optimal, site-specific rules in a Building Management System to set control variables that control the cooling systems. Services and software for optimizing the cooling system operation have emerged, but these systems achieve a sub-optimal result by making decisions based on equipment manufacturers' performance curves rather than empirical operating data for the cooling system under control. These optimization solutions also miss the opportunity to consider the impact of the cooling system on the power consumption of air handling units (AHUs). Specifically, cooling system components such as chiller plants consume a large amount of energy. These chillers operate based on several control variables that administrators manually set to a particular value (setpoint) based on manufacture suggestion or personal experience.

Existing approaches to chiller plant operation are based on a mechanical engineering approach to the problem. They require the behavior of each component of the chiller plant be specified by and provided by the manufacturer of the component. Then the component models are combined to form a prediction model of the chiller plant that is used to solve an optimization problem.

However, the manufacture suggestion and the personal experience of the administrator do not have the hindsight of historical data at the site to minimize power consumption efficiently.

Therefore there is a need in the art for a method and apparatus for optimizing control variables to minimize power consumption of cooling systems by.

SUMMARY OF THE INVENTION

An apparatus and/or method for optimizing control variables to minimize power consumption of cooling systems.

Various advantages, aspects and features of the present disclosure, as well as details of an illustrated embodiment thereof, are more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 9:
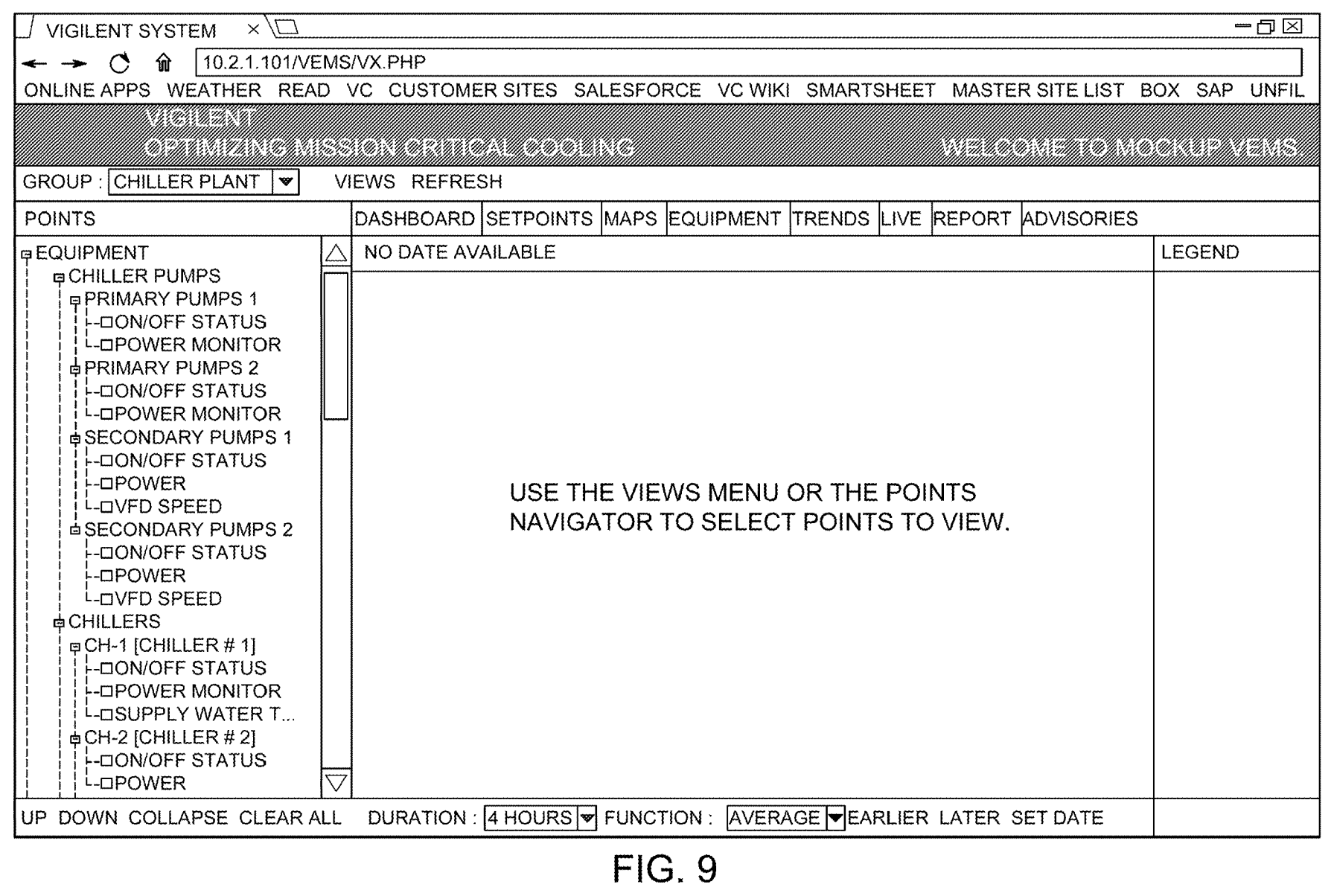
Figure 10:
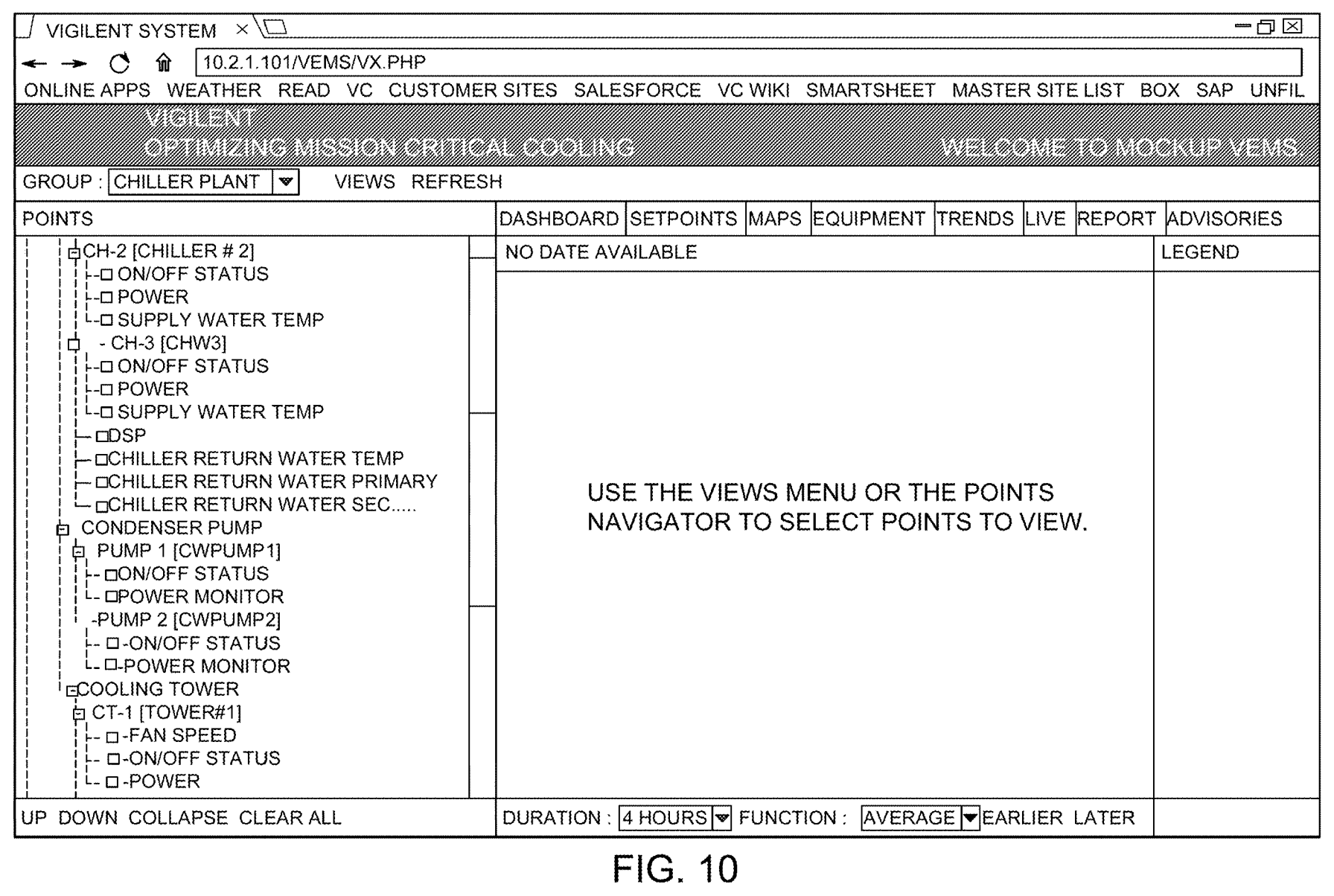

FIGS. 9-12 depicts an embodiment of a visual interface for interacting with the cooling control system in accordance with exemplary embodiments of the present invention;

DETAILED DESCRIPTION

Embodiments of the present invention generally relate minimizing power consumption of cooling systems by optimizing control variables. According to one embodiment, a cooling control system is used to monitor various parts of a cooling system, including in-built sensors. Additionally, the cooling control system can interact with sensors placed exogenously in the cooling system to monitor for particular conditions such as water temperature, air temperature, outside temperature or the like. The sensors are monitored over a period of time to establish historically recorded values for various control variables associated with the power consumed by the cooling system. The control variable values and associated power consumption are stored in a data store as a time series of data. Based on the time series stored in the data store, the cooling control system calculates the setpoint values for the various control variables for optimal power consumption and sets those control variables to those setpoints. Additionally, the cooling control system explores values for which optimal setpoints have not been determined to assess whether the explored values positively or negatively impact the power consumption of the cooling system.

Figure 1:
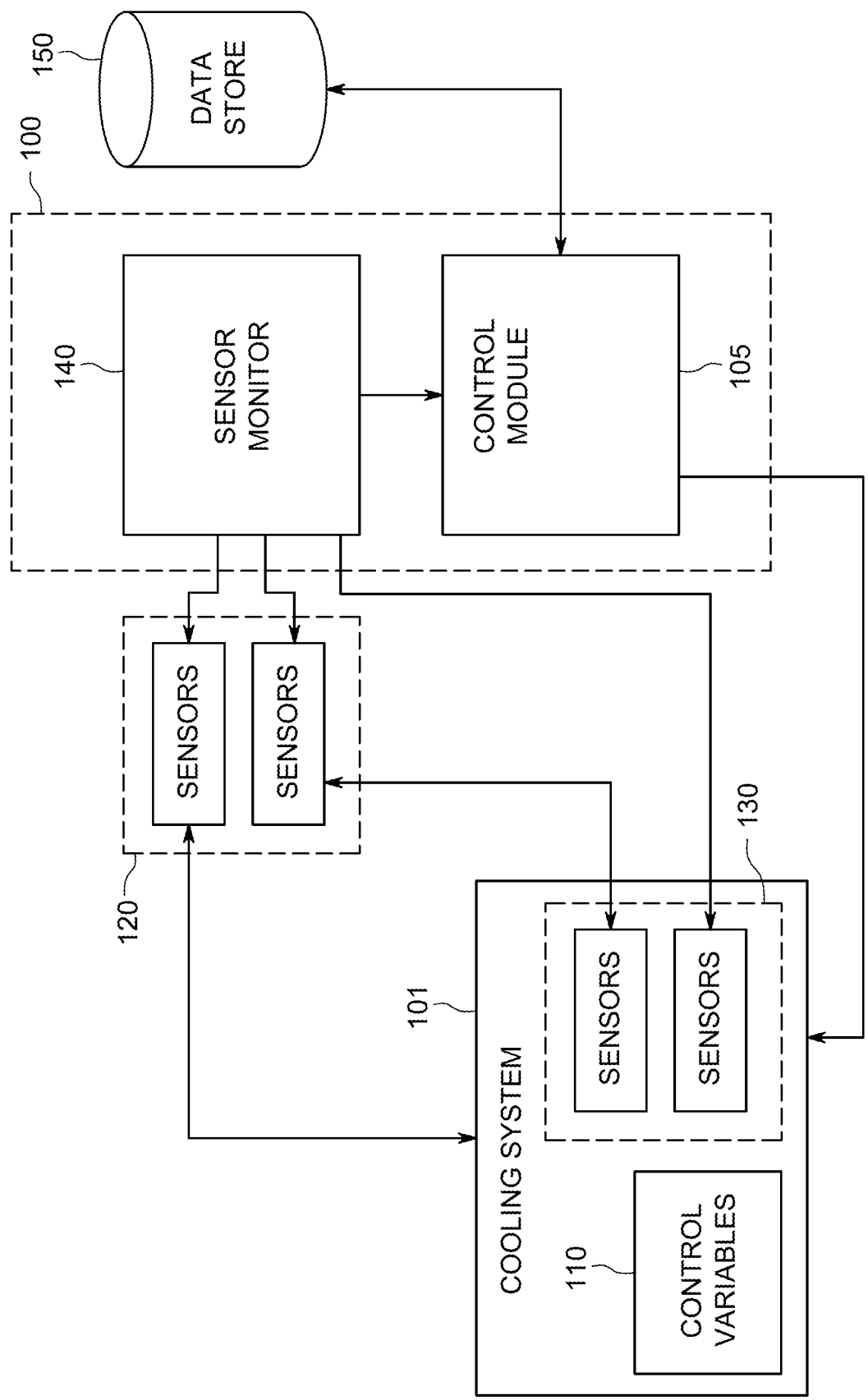
FIG. 1 depicts a functional block diagram of a cooling system coupled to a cooling control system in accordance with exemplary embodiments of the present invention.

FIG. 1 depicts a functional block diagram of a cooling system 101 coupled to a cooling control system 100 in accordance with exemplary embodiments of the present invention.

The cooling system 101 is associated with a plurality of control variables 110 which control operation of the cooling system 101. The control variables 110 are controlled and modified by the cooling control system 100, and in some instances, may have their values persisted stored in the data store 150. In exemplary embodiments, the cooling system 101 is comprised of a plurality of chiller plants which regulate the temperature of water, as the water is used throughout a facility for various purposes and white-space air-handling components.

The cooling control system 100 comprises a control module 105 and a sensor monitor 140. The control module 105 may be adjusted to monitor and adjust the setpoints on a regular periodic basis, or may be configured to run only in particular conditions. Those of ordinary skill in the art will recognize that the cooling control system 100 is not limited to particular schedules. Additionally, the sensor monitor 140 may read data from sensors 120 and 130 according to a schedule appropriate for a particular type of cooling system, or as predetermined by an administrator of the system. Over time, the cooling control system 100 may learn the adjustment cycles of various control variables via the reading of the sensors and may control when particular sensors are enabled or disabled. According to exemplary embodiments, an operator of the cooling control system 100 can observe the control variables 110 and their particular settings via a visual interface. Examples of such interfaces are shown in FIGS. 9-12.

In one embodiment, the control variables 110 may comprise analog control variables and Boolean control variables. According to this embodiment, the analog control variables may comprise at least discharge air temperature set point (DASTP) offset, chilled water supply temperature setpoint, chilled water deltaT setpoint, water side economizer offset, condenser offset deltaT setpoint and cooling tower approach setpoint. The boolean control variables may comprise at least chiller operational status (e.g., whether a chiller is in an ON or OFF state), water-side economizer operational status (e.g., whether a heat exchanger is activated), and others. The preset invention does not limit the type and amount of control variables that may be used in a system.

DATSP represents the difference between the discharge air temperature setpoint of the white floor cooling units and the chilled water supply temperature. If the control module 105 controls the discharge air temperature setpoint of the white floor cooling units, then DATSP offset is an analog optimization variable.

Chilled water supply temperature setpoint is the temperature of the water that the chillers or free-cooling heat exchangers attempt to produce. Typically, the chilled water supply temperature setpoint is established at the same value for all operating chillers and heat exchangers. The chilled water supply temperature setpoint is generally the highest-priority analog control variable because it has a large impact on chiller plant efficiency.

Chilled water deltaT setpoint represents the difference between the water temperature entering the chiller and the water temperature leaving the chiller. The chilled water pressure setpoint is reset to maintain the chilled water deltaT close to its setpoint. A Per-Unit Controller (PUC) adjusts a Variable Frequency Drive (VFD) to regulate the chilled water differential pressure at the chilled water pressure setpoint. The chilled water deltaT setpoint is an analog control variable. Alternatively, in another embodiment the chilled water pressure setpoint itself could be an analog control variable, in which case the chilled water deltaT is not used.

Chiller status is an ON/OFF status of an individual chiller. The ON/OFF status of a chiller typically coincides with ON/OFF status of a chilled water pump and a condenser water pump so that there will be adequate water flow through the evaporator and condenser of a chiller. A chiller status is a boolean control variable. If the chillers in the cooling system 101 are nominally identical, then in one embodiment an integer optimization variable corresponds to the number of chillers in the ON state. If the total cooling load exceeds a predetermined limit (e.g., a large fraction of the capacity of the ON chillers), then the control module 105 will start a chiller. If the total cooling load drops below a predetermined low limit (e.g., a small fraction of the capacity of the ON chillers), then the control module 105 will stop a chiller.

In a parallel configuration, a water-side economizer is typically enabled when the cooling tower entering wet bulb temperature along with the cooling tower approach and the economizer offset is less than the chilled water return temperature. If the water-side economizer offset is too small, the economizer won't provide much cooling but will still use power for its chilled water and condenser water pumps, and its cooling tower fan. If the water-side economizer offset is too large, then there will be operating conditions where the economizer could have been ON, helping to reduce the total power consumption of the cooling system 101. When the economizer is ON, the cooling tower fans are modulated to maintain the leaving chilled water temperature close to its setpoint; the chilled water pump and the condenser water pump operate the same way as when they are pumping water through a chiller. According to exemplary embodiments, the water-side economizer offset is determined by comparing the optimization result (whether or not the economizer should be ON or OFF) with the current operation (whether or not it is ON or OFF). If it should be ON but is OFF, then the offset will be reduced. If it should be OFF, but is ON, then the offset will be increased.

Condenser water "deltaT" represents the difference between the water temperature leaving the condenser and the water temperature entering the condenser. A PUC adjusts a condenser water pump VFD to keep the condenser water deltaT close to its setpoint.

The theoretical minimum water temperature that a cooling tower can make is referred to as the entering air wet bulb temperature. The difference between the cooling tower leaving water (sump) temperature and the entering air wet bulb temperature is the cooling tower approach setpoint. A PUC adjusts the speed of the cooling tower fans (e.g., with a VFD) to hold the cooling tower leaving water temperature close to the cooling tower leaving water temperature setpoint. The cooling tower leaving water temperature setpoint is equal to the wet bulb temperature plus the Cooling Tower Approach Setpoint.

In one exemplary embodiment, a chiller plant chilled water hydronic system may be a primary-secondary design with fixed-speed primary pumps (one per chiller) and variable-speed secondary pumps (one or more per loop), or it may be a primary-only design with variable-speed primary pumps (one per chiller). The chillers may have fixed-speed compressors or variable-speed compressors. The condenser water hydronic system may serve a common cooling tower sump, or there may be an individual condenser water loop per chiller so that each chiller has its own dedicated cooling tower. It is becoming increasingly common to design chiller plants with water-side economizers (also known as free-cooling heat exchangers). Water-side economizers may be arranged in parallel with chillers, or in series with chillers. Additional design complexities such as tertiary hydronic loops and water-side economizers that can be switched from series to parallel with control valves are possible.

A plurality of sensors is coupled to the cooling system 101. In some instances, internal sensors 130 measure internal properties of the cooling system 101. In other instances, external sensors 120 measure external properties of the cooling system 101 as well as the environment surrounding the cooling system 101. In some embodiments, the internal sensors 130 measure particular outcomes of the various control variables 110, or may directly measure the value of the control variables 110.

Sensor monitor 140 interfaces with external sensors 120 and internal sensors 130 to read the values on a periodic basis. The sensor monitor 140 is coupled to the control module 105. The control module 105 stores the sensor readings from the sensor monitor 140 in data store 150. Primarily, the control module 105 sets the control variables 110 to optimize the power consumption of the cooling system 101. The control module 105 also monitors the power consumption of the cooling system 101 with granularity, monitoring each component and its corresponding power consumption, given its particular set of control variables. For example, a particular chiller plant may produce more power when the control variables are set at a particular setpoint as compared to another chiller plant with similar setpoints. Such inconsistencies are common in real-world application, thus the control module 105 tracks and stores the power consumption data in data store 150. In exemplary embodiments, the data stored in data store 150 are compressed and represent fifteen minute averages or sixty minute averages.

After a predetermined period of data collection has completed, the cooling control system 100 determines which particular combinations of control variable settings were most efficient, i.e., which settings caused the least power to be consumed. The determination is made by, for example, retrieving data from the data store 150, and fitting the analog control variables to a convex function while using indicator variables for Boolean control variables to the "cost" to be minimized (this will be referred to as the Optimization Step). In some embodiments, cost could be power, Coefficient of Performance (COP), or second-law efficiency, i.e., the efficiency of a process taking the second law of thermodynamics into account.

Given the convex function, the control module 105 determines the values of the analog optimization variables and combination of Boolean and ordinal variables that minimize the cost function of the Optimization Step. These variable values that minimize the cost function are then used to set the control variables 110 to the particular values as setpoints in order minimize power consumption of the cooling system 101.

Additionally the control module 105 can interrogate the data store 150 to determine whether external sensors 120 or internal sensors 130 have remained in a certain narrow range which is narrower than a permitted range. If the values have remained in a particular narrow range, the control module 105 will experiment and set a control variable to another value within the permitted range to determine the impact on power consumption. Accordingly, the data store 150 will have a more robust data set where control variables can be optimized across the entire permitted range as opposed to a narrow range. To achieve this, the control module 105 computes the rank of the predictor matrix to be used in the optimization step. If the predictor matrix is rank-deficient, components of the control module 105 determines if the deficiency is due to insufficient sampling of a Boolean optimization variable. If the deficiency is due to insufficient sampling, then the control module 105 chooses a value of the highest-priority Boolean optimization variable that will improve the rank. A model-fit is performed to a convex function as described above and optimized based on the subset of the data that has full rank. If more than one Boolean optimization variable has not been sampled, then the current value of the lesser-priority Boolean optimization variables is chosen as the command value.

According to one embodiment, the cooling control system 100 enables a protective mode for the cooling system, where the chilled water setpoint ramps towards its low limit at a particular rate ("Guard Mode ramp rate") and the chilled water pressure setpoint ramps towards the upper limit at its Guard Mode ramp rate. The upper limit of the allowable range of the chilled water temperature setpoint is decreased and the lower limit of the allowable range of the chilled water pressure setpoint is increased. According to exemplary embodiments, Guard Mode is a protective behavior invoked automatically when something has failed or "gone wrong". For example, sensor failures that prevent the control application from making decisions may invoke Guard Mode. The cooling control system 100 ramps towards full cooling when there is a significant problem because full cooling is regarded as a safe operating point where failure is generally avoided.

Figure 2:
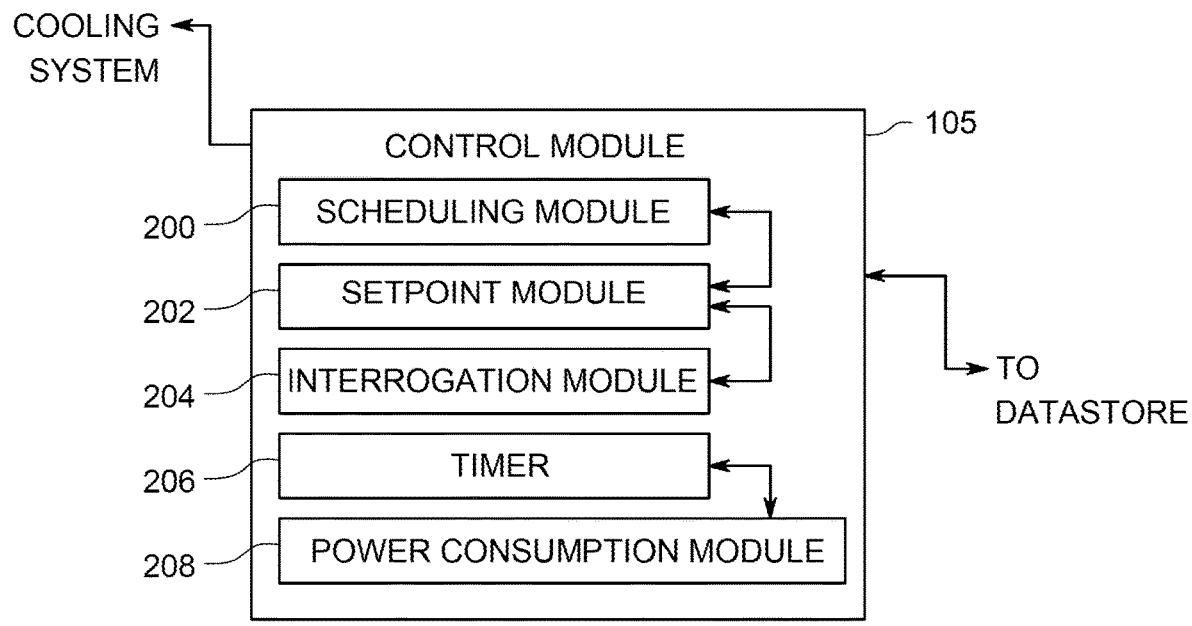
FIG. 2 is a block diagram of the components of the control module of FIG. 1 in accordance with exemplary embodiments of the present invention.

FIG. 2 is a block diagram of the components of the control module 105 of FIG. 1 in accordance with exemplary embodiments of the present invention.

The control module 105 comprises a scheduling module 200, a setpoint module 202, an interrogation module 204, a timer 206 and a power consumption module 208. As described in FIG. 1, the control module 105 couples directly with the cooling system 101 and indirectly with the cooling system 101 via the sensor monitor 140. Additionally, the control module 105 couples with the data store 150, either through a wired network, wireless network, cloud-based coupling, or a direct coupling. The scheduling module 200 operates in conjunction with the setpoint module 202 and the timer 206 to modify the control variables 110 of the cooling system 101 according to a determined schedule. Often, the schedule is constructed as a result of calculating what the ideal settings for particular control variables are according to the time and day of operation. The ideal control variables are determined by the setpoint module which combination of control variables result in a minimum cost based on the fitting the control variables to a cost function. The setpoint module 202 sets the control points to the requested setpoint.

The interrogation module 204 explores various ranges for each control variable. If some values in a range for a particular control variable have not been observed in the cooling system 101 according to the data stored in data store 150, the interrogation module 203 attempts to seek out such values and instructs the setpoint module 202 to set those control variables to the unobserved values to gauge the impact on power consumption of the cooling system 101. Additionally, this allows for greater robustness of the data in data store 150 as the exploration leads to more historical data regarding the sensor readings.

The timer 206 operates in conjunction with various other modules such as the power consumption module 208, the interrogation module 204 and the scheduling module 200. The timer 206 may signal when a particular time period has passed so that a sensor data collection should occur, or so that power consumption of the cooling system 101 along with all control variable states should be measured.

The power consumption module 208 selects optimized setpoints for the control variables to be set to according to a particular schedule. The power consumption module 208 also measures the power consumed by the cooling system 101 in addition to initiating the interrogation module 204 to explore ranges for various control variables.

Figure 3:
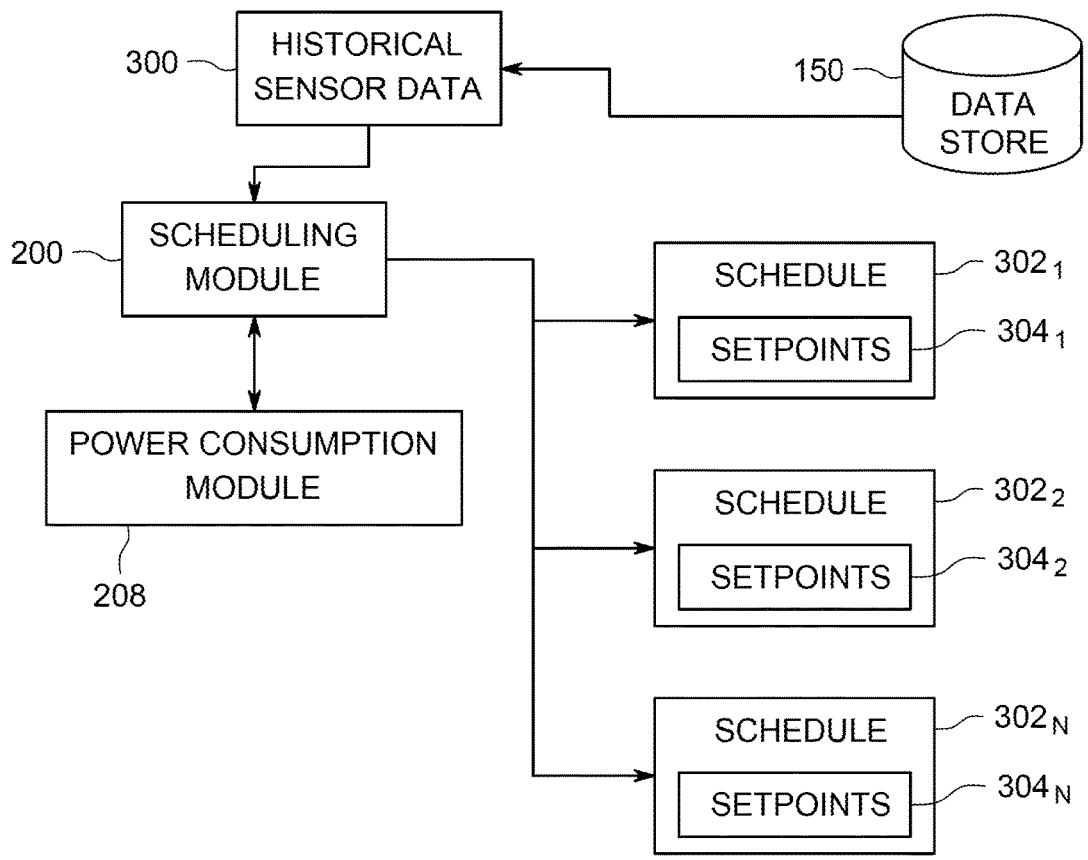
FIG. 3 is a block diagram of the scheduling module in accordance with exemplary embodiments of the present invention.

FIG. 3 is a functional block diagram of the scheduling module 200 in accordance with exemplary embodiments of the present invention.

Historical sensor data 300 is retrieved from the data store 150 via a request from the control module 105. The control module 105 redirects the response to the scheduling module 200. In conjunction with the power consumption module 208, the scheduling module 200 generates various schedules, e.g., schedule $302_1$, schedule $302_2$ to schedule $302_N$. The schedule determines a date/time for when particular control variables are modified or set to a particular setpoint. Each schedule contains a plurality of setpoints, e.g., setpoints $304_1$ to $304_3$, where each setpoint in the plurality of setpoints corresponds to a particular control variable. For example, schedule $302_1$ may contain setpoints $304_1$ which indicate that the control variable "chilled water supply temperature" is set to a setpoint value A, the control variable "DATSP" is set to setpoint value B and the control variable "chilled water deltaT" is set to setpoint value C. The power consumption module 208 determines that these setpoints are the optimized setpoints for minimal power consumption for the particular data and time indicated in the schedule $302_1$.

Figure 4:
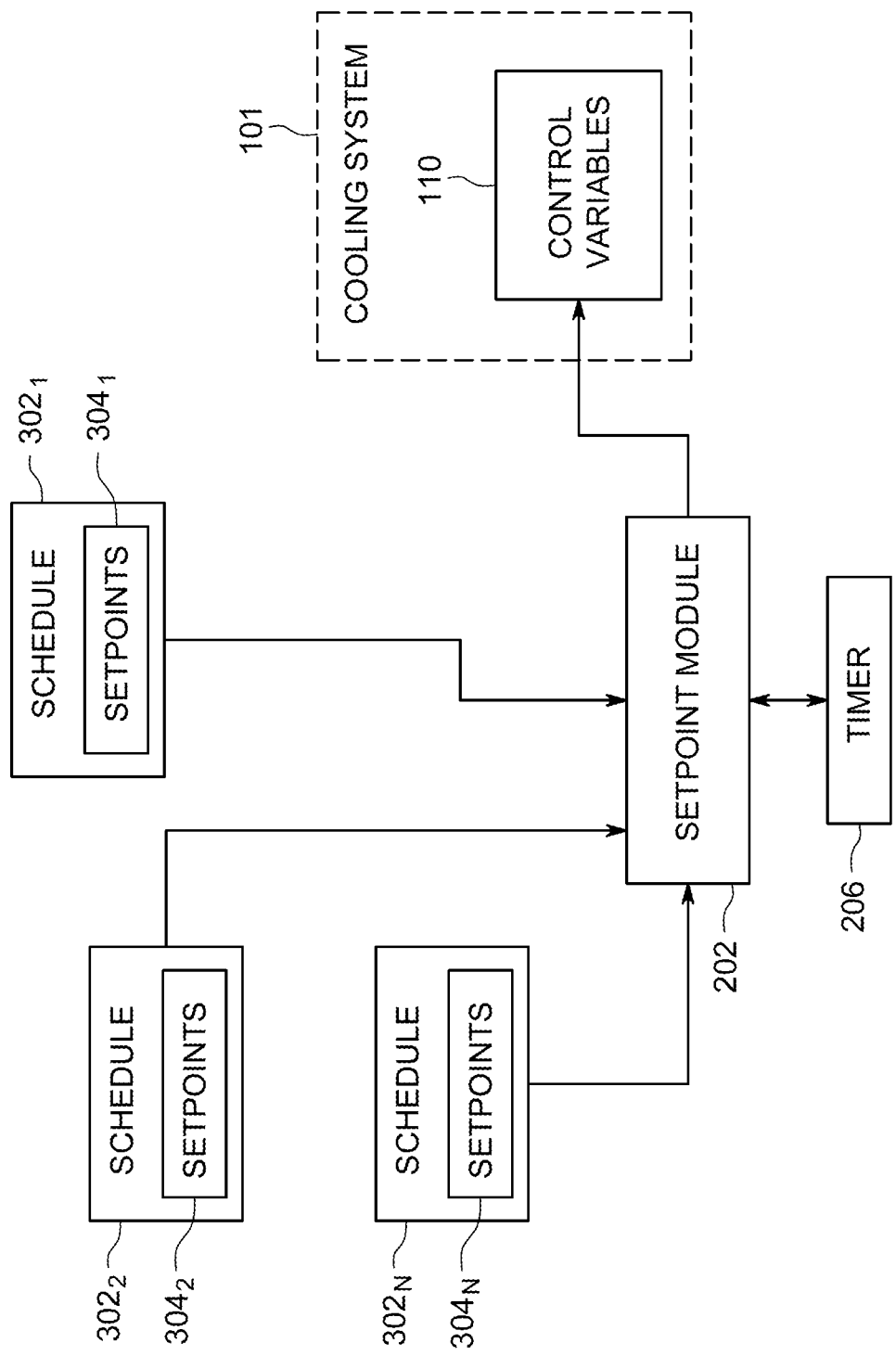
FIG. 4 is a block diagram of the setpoint module in accordance with exemplary embodiments of the present invention.

Once the schedules are determined by the scheduling module 200, the schedules are coupled to the setpoint module 202 as illustrated in FIG. 4.

FIG. 4 is a functional block diagram of the setpoint module 202 in accordance with exemplary embodiments of the present invention.

The scheduling module 200 couples the schedules $302_1$, schedule $302_1$ to schedule $302_N$ to the setpoint module 202. The setpoint module 202 performs all setpoint adjustments to the control variables 110 of the cooling system 101 based on the input schedules $302_1$ to $302_N$. The setpoint module 202 iterates through a particular schedule's setpoints 304 and sets each corresponding control variable to the value specified. The setpoint module 202 operates in conjunction with the timer 206 to adjust the control variables at the date and time indicated by the input schedule.

Figure 5:
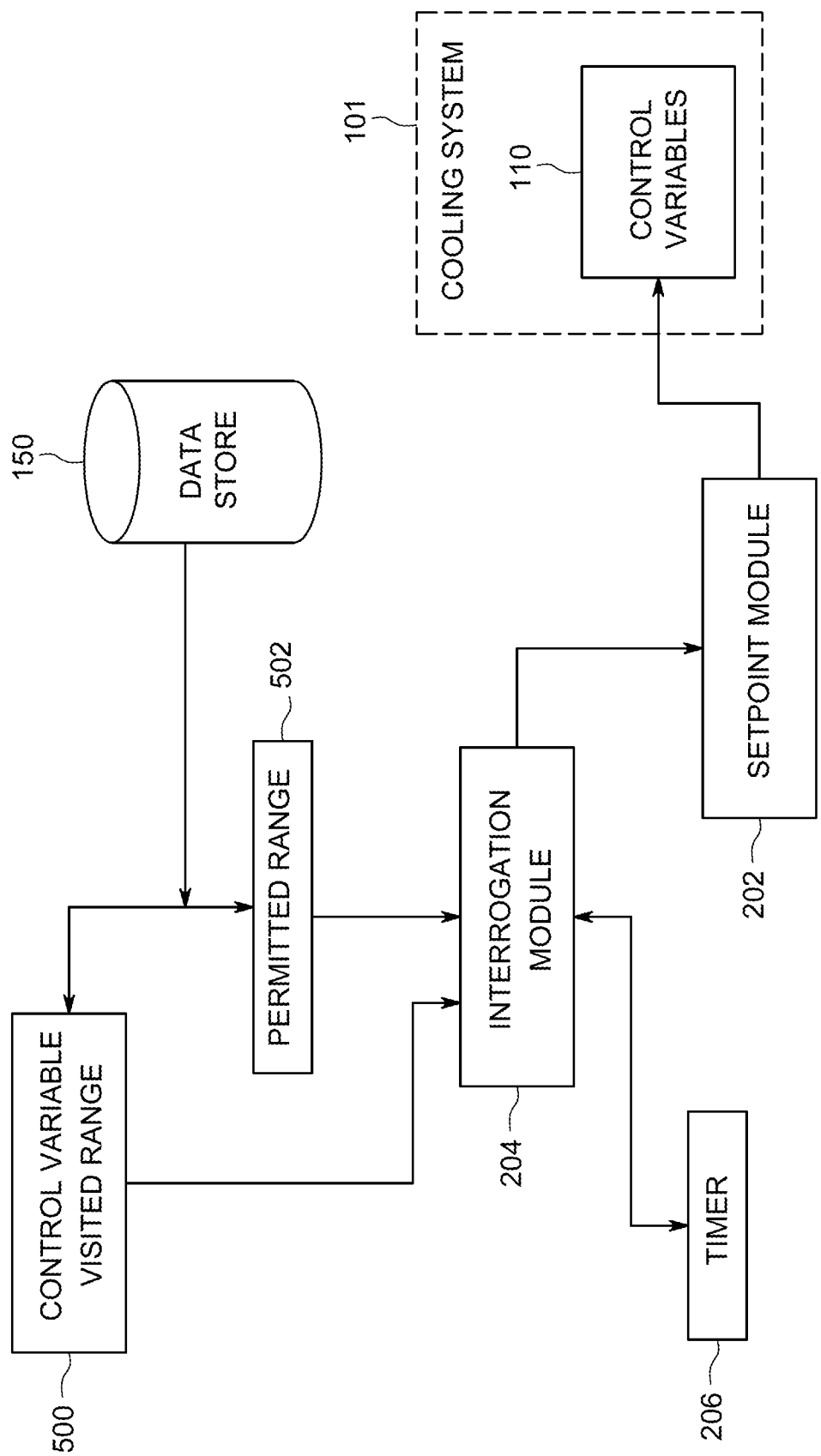
FIG. 5 is a block diagram of the interrogation module in accordance with exemplary embodiments of the present invention.

FIG. 5 is a functional block diagram of the interrogation module 204 in accordance with exemplary embodiments of the present invention.

The interrogation module 204 examines permitted ranges for each control variable 110 and then queries the data store 150 to determine the visited ranges of every control variable, i.e. control variable visited range 500. The data store 150 also returns a permitted range 502, which indicates the range of functional values for each of the control variables 110. If a particular value in the permitted range is not applied as a setpoint for a control variable in the history of the control variable, the interrogation module 204 will experiment by commanding the setpoint module 202 to set the control variable to that unvisited value. Power consumption is measured by the power consumption module 208, and the unvisited value now has an associated power consumption stored in historical sensor data.

Figure 6:
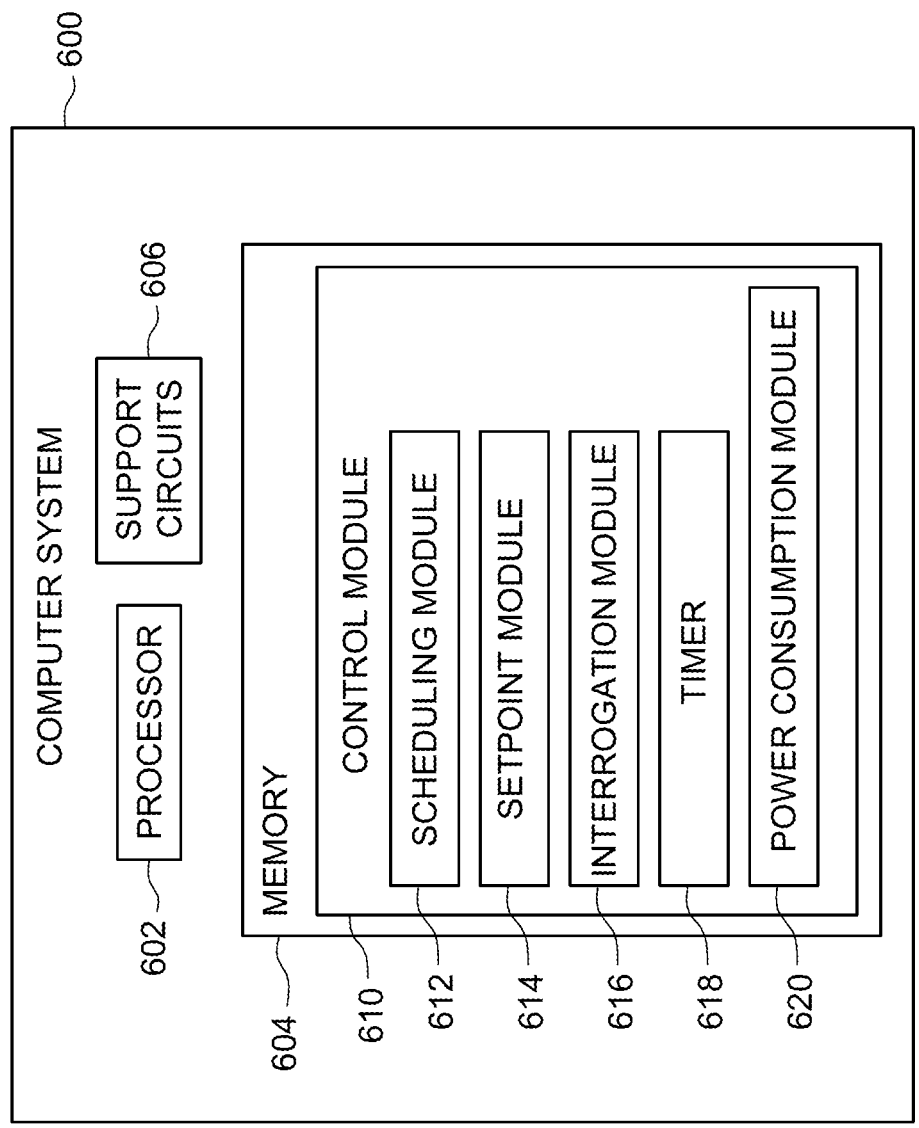
FIG. 6 is a block diagram of a computer system in accordance with exemplary embodiments of the present invention.

FIG. 6 is a block diagram of a computer system 600 in accordance with exemplary embodiments of the present invention.

In some embodiments, the control module 105 may be implemented using a one or more of such computers, for example a group of servers or the like. Each computer may have one or more processors as known to those of ordinary skill in the art. The computer system 600 may be used to implement the functionality of the control module 105 as the control module 610. The computer system 600 includes a processor 602, various support circuits 606, and memory 604. The processor 602 may include one or more microprocessors known in the art. The support circuits 606 for the processor 602 include conventional cache, power supplies, clock circuits, data registers, an I/O interface, and the like. The I/O interface may be directly coupled to the memory 604 or coupled through the supporting circuits 606. The I/O interface 607 may also be configured for communication with input devices and/or output devices such as network devices, various storage devices, mouse, keyboard, display, and the like.

The memory 604, or computer readable medium, stores non-transient processor-executable instructions and/or data that may be executed by and/or used by the processor 602. These processor-executable instructions may comprise firmware, software, and the like, or some combination thereof. Modules having processor-executable instructions that are stored in the memory 604 comprise a control module 610, which further comprises a scheduling module 612, a setpoint module 614, an interrogation module 616, a timer 618 and a power consumption module 620. The memory 604 may include one or more of the following random access memory, read only memory, magneto-resistive read/write memory, optical read/write memory, cache memory, magnetic read/write memory, and the like, as well as signal-bearing media as described below.

Figure 7:
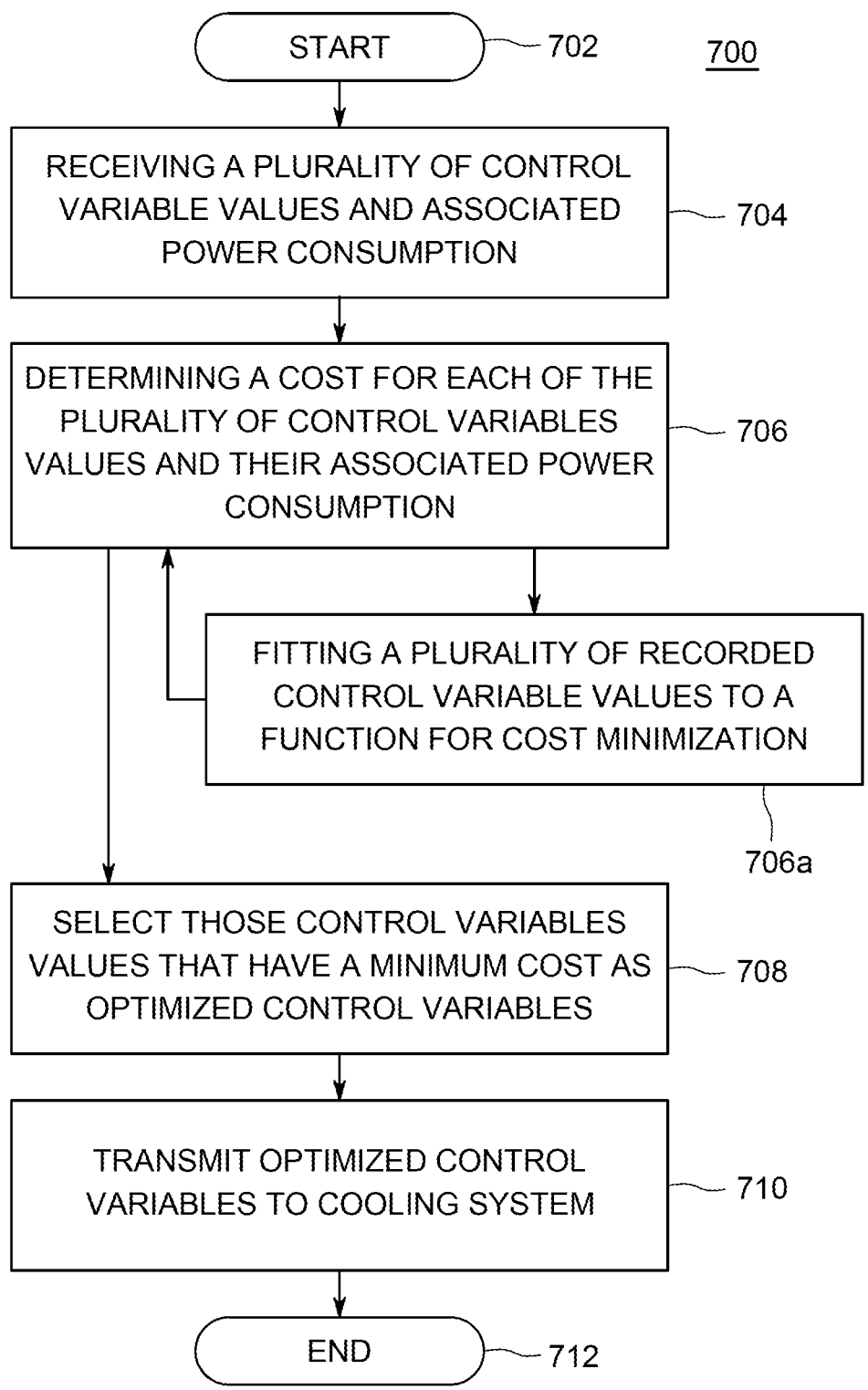
FIG. 7 is a flow diagram for a method for minimizing power consumption of a cooling system by optimizing control variables in accordance with exemplary embodiments of the present invention.

FIG. 7 is a flow diagram for a method 700 for minimizing power consumption of a cooling system by optimizing control variables in accordance with exemplary embodiments of the present invention.

The method 700 begins at step 702 and proceeds to step 704. At step 704, the control module 610 receives a plurality of control variable values and associated power consumption from a datastore. The plurality of control variable values is historical data sensed by various sensors which monitor cooling systems such as chiller plants and the like. Each sensor data set is associated with a particular date and time and the power consumption for that date and time and the particular setpoints for each control variable. Thus, the date stored in a datastore indicates every historically recorded combination of control variable setpoints and the power consumed by the cooling system in that particular arrangement of control variables.

At step 706, the setpoint module 614 determines a cost for each of the plurality of control variables and their associated power consumption where exogenous variables correspond to the plurality of control variables. According to one embodiment, cost of any configured control variable is determined.

According to one embodiment, the method 700 proceeds to step 706a, where the cost minimization is performed by the setpoint module 614 as follows: the plurality of control variables values are fitted to a function for cost minimization.

The method proceeds to step 708, where the setpoint module 614 selects those control variables that have a minimum cost as the optimized control variables. At step 710, the setpoint module 614 sets the control variables of the cooling system to the optimized control variables in order to minimize power consumed by the cooling system. The method ends at step 712.

Figure 8:
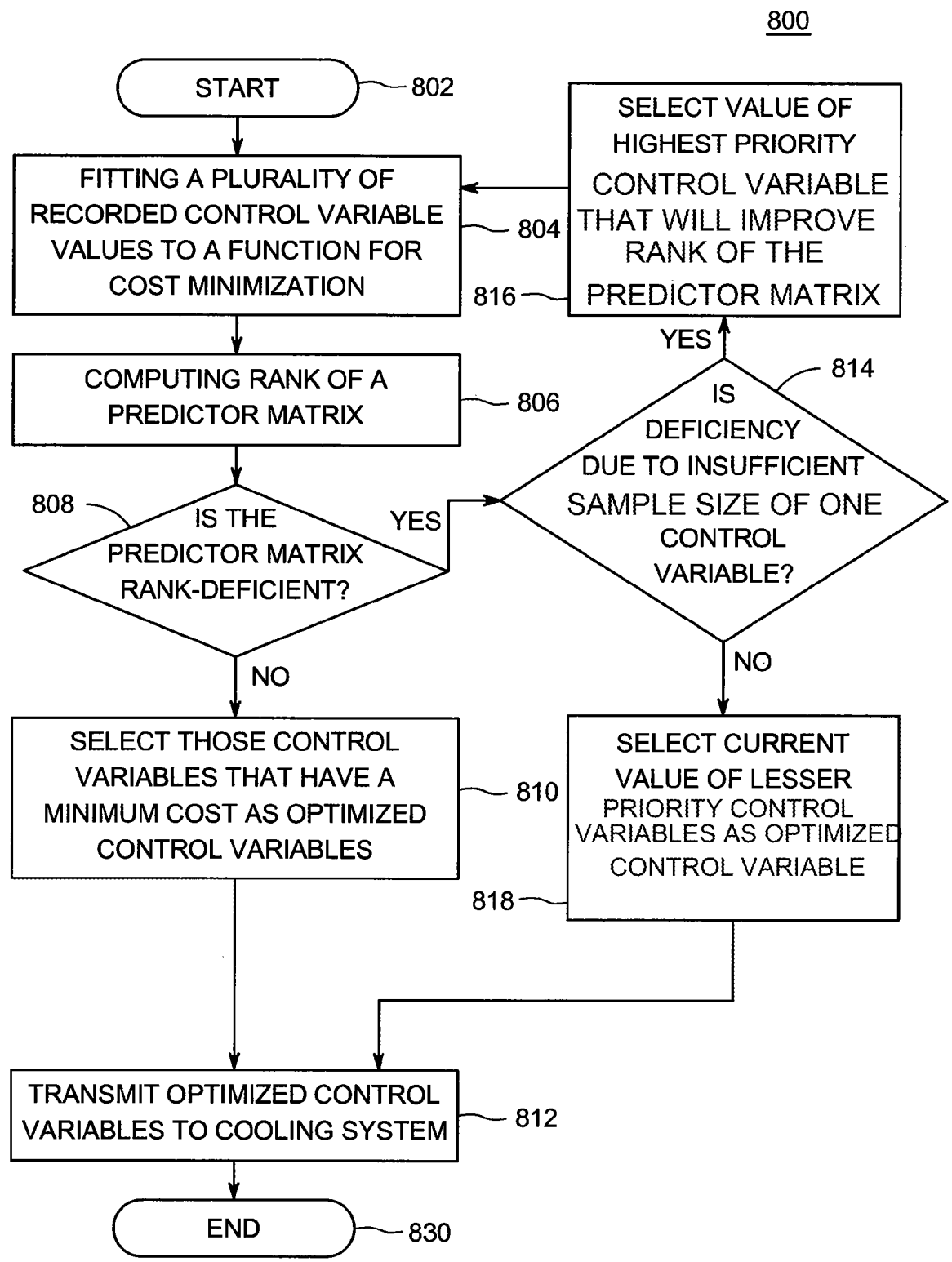
FIG. 8 is a flow diagram for a method for minimizing power consumption of a cooling system by exploring control variables values in accordance with exemplary embodiments of the present invention.
Figure 11:
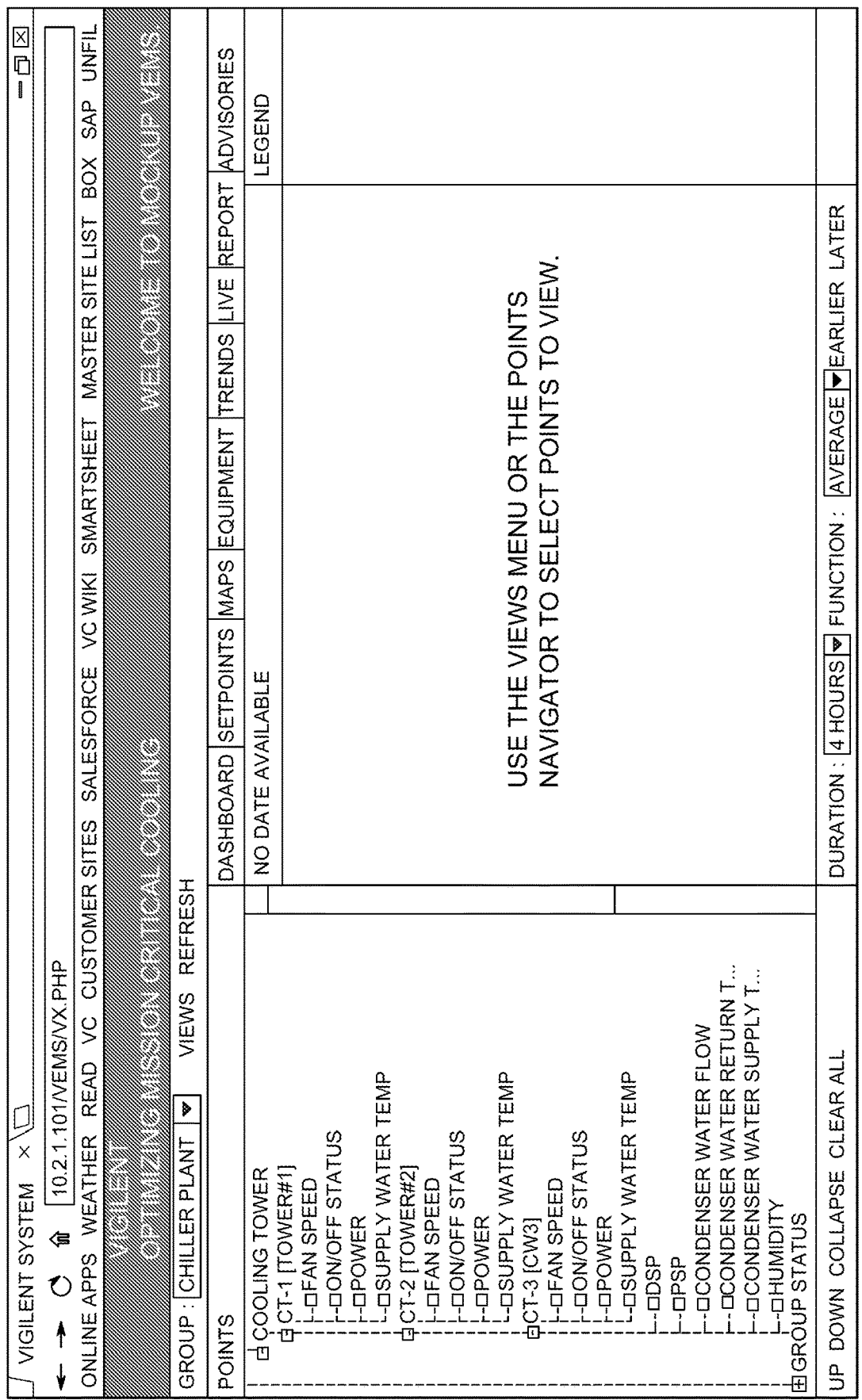
Figure 12:
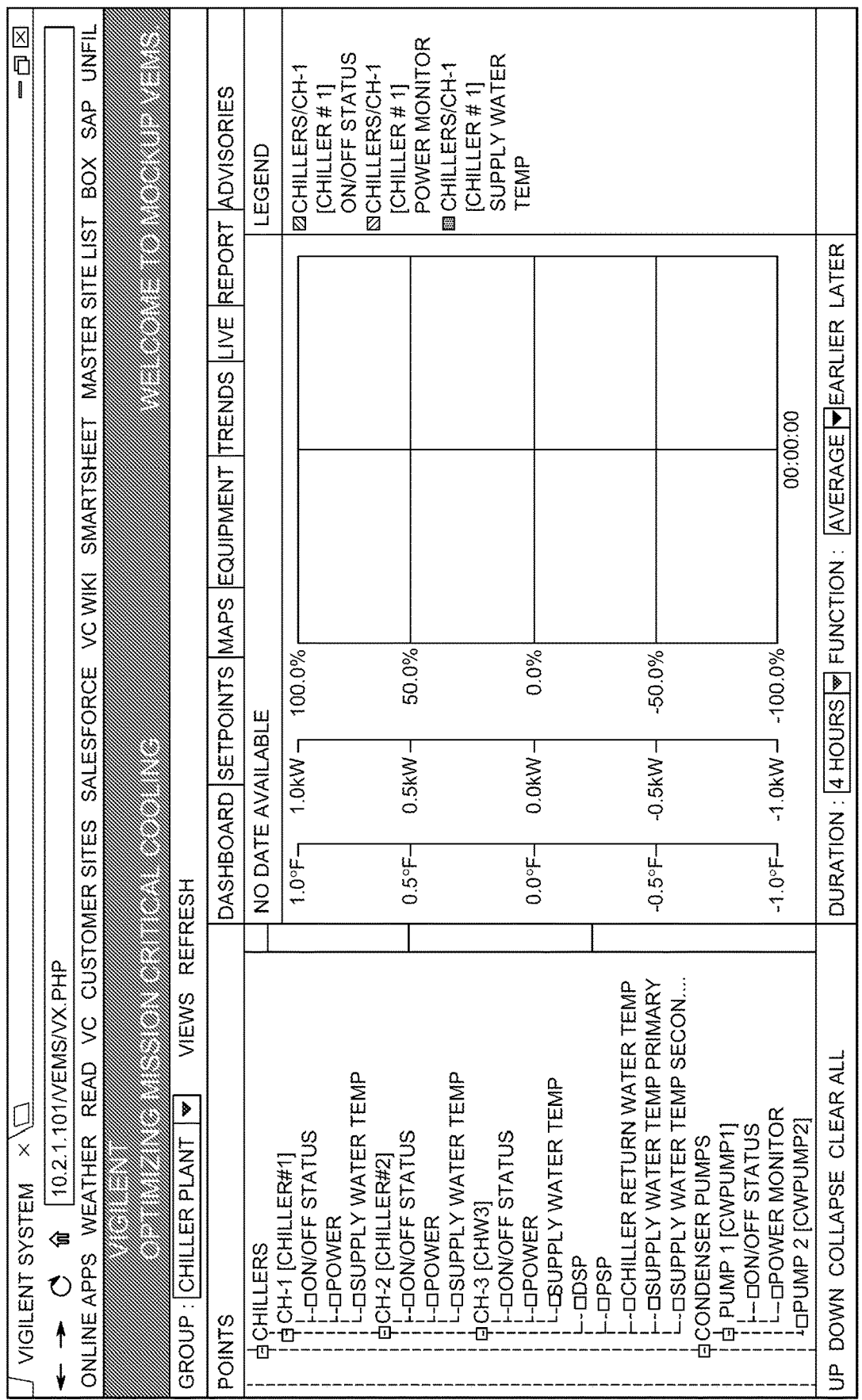

FIG. 8 is a flow diagram for a method 800 for minimizing power consumption of a cooling system by exploring control variables values in accordance with exemplary embodiments of the present invention.

Method 800 is an exemplary embodiment of the functionality of the interrogation module 616, the setpoint module 614 and the timer 618 as executed by the processor 602 of the computer system 600.

The method begins at step 802 and proceeds to step 804. At step 804, the setpoint module 614 fits a plurality of the control variable values to a function for cost minimization. At step 806, the setpoint module 614 computes a rank of the predictor matrix, where the predictor matrix is an array of independent predictor variables in a linearly parameterized regression problem. For polynomial regression, the predictor matrix includes a constant term, linear terms, cross-terms and quadratic terms for the independent variables.

At step 808, the interrogation module 616 determines whether the predictor matrix is rank-deficient. If the predictor is rank deficient, the method proceeds to step 814, where the interrogation module 616 further determines whether the deficiency is due to insufficient sample size of a control variable history (in some embodiments, a Boolean control variable).

If the deficiency is due to insufficient sample size of the control variable, the method proceeds to step 816, where the interrogation module 616 selects the value of the highest priority control variable value that will improve the rank of the predictor matrix. The method then proceeds to step 804 where model-fitting is performed again.

If the deficiency is due to more than one control variable, the method proceeds to step 818, where the interrogation module 616 selects a current value of a lesser priority control variable as the optimized control variable. The method then proceeds to step 812, where the setpoint module 614 transmits the optimized control variables to the cooling system. The method terminates at step 830.

At step 808, if the interrogation module 616 determines that the predictor matrix is not rank-deficient, the method proceeds to step 810, where the control variables that have minimum cost are selected as the optimized control variables. The method then proceeds to step 812, where the optimized variables are transmitted to the cooling system by the setpoint module 614 to set the control variables of the cooling system. The method terminates at step 830.

Figure 13:
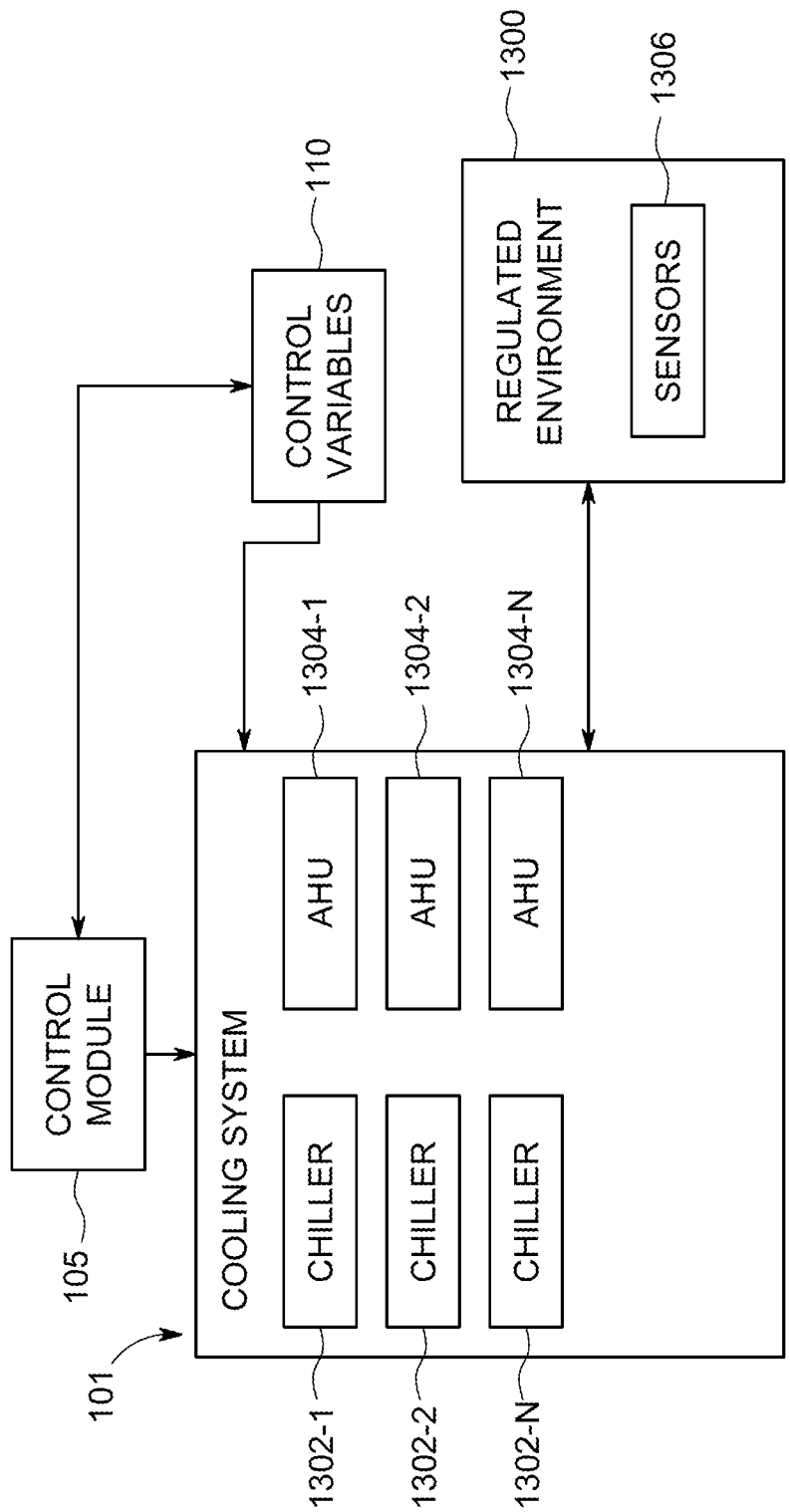
FIG. 13 is a functional block diagram of cooling system 101 in accordance with other exemplary embodiments of the present invention.

FIG. 13 is a functional block diagram of cooling system 101 in accordance with other exemplary embodiments of the present invention.

The cooling system 101 includes chillers 1302-1, 1302-2 to 1302-N and AHUs 1304-1, 1304-2 to 1304-N. The control module 105 sets a plurality of control variables 110 that control the chillers 1302-1 to 1302-N and the AHUs 1304-1 to 1304-N. In some embodiments, the control variables 110 are modified effecting operation of the chillers and AHUs, modifying the conditions of the regulated environment 1300.

In one embodiment, the control variables 110 comprise not only the setpoints described above with reference to FIG. 1, but also comprise discharge air temperature for the AHUs 1304-1 to 1304-N and water pump speeds for the chillers 1302-1 to 1302-N, in addition to other control settings for the cooling system 101. Additionally, the control module 105 is coupled to sensors 1306 in the regulated environment 1300 which monitor temperature and other settings.

Administrators of the cooling system 101 may consider running very cold water (e.g., 42 degrees) as a default setting in order to reduce temperature in the regulated environment 1300. This increases the energy consumed by the cooling system 101 unnecessarily, while not significantly reducing the temperature of the regulated environment 1300. The methods described in FIG. 14-19 describe methods for controlling and improving the local efficiency of cooling system 101 based on feedback mechanisms. In some embodiments, the methods described below can be used in conjunction with the recorded historical data in order to achieve local efficiencies along with global efficiencies.

Figure 14:
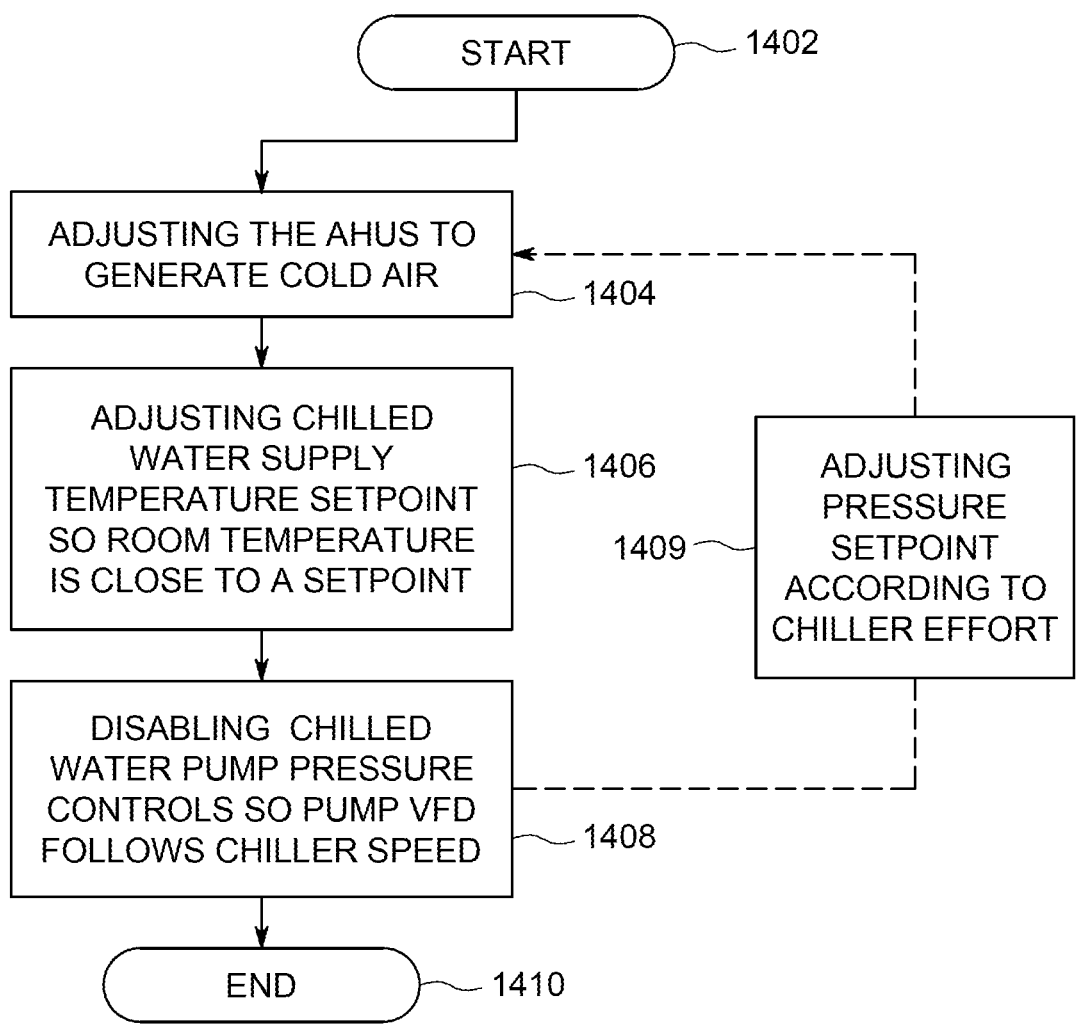
FIG. 14 illustrates a flow diagram for a method of improving energy performance of cooling system in accordance with exemplary embodiments of the present invention.

FIG. 14 illustrates a flow diagram for a method of improving energy performance of cooling system 101 in accordance with exemplary embodiments of the present invention.

The method begins at step 1402 and proceeds to step 1404 where the AHUs 1304-1 to 1304-N are adjusted to generate cold air by setting a particular discharge air temperature (DAT) setpoint by the control module 105. In another embodiment, the control module 105 can command the AHUs to generate cold air based on a setting a return air temperature (RAT) setpoint (e.g., DAT setpoint could be set to 60° F. or RAT setpoint could be set to 70° F.). Water valves for each AHU aid in achieving a particular setpoint and where the DAT or RAT is set to a sufficiently low value, the AHU will be forced to open the water valve fully to reach the low temperature value.

At step 1406, the control module 105 then adjusts the chilled water setpoint so that cold temperatures in the regulated environment 1300 are within a predetermined nearness to a setpoint value for DAT or RAT. In one embodiment, the control module 105 operates the chillers 1302-1 to 1302-N so that some excess cooling capacity remains, in case a Guard mode (described below) must be enabled to protect the regulated environment 1300.

Next, the method proceeds to step 1408, where the control module 105 disables chilled water pump pressure controls and has the chilled water pump VFD speed follow the chiller down to a minimum speed. For example, if the control module 105 determines that the chiller is using 80% of capacity current, the chilled water pump VFDs are controlled to use a similar current for operation. In some embodiments, the control module 105 is programmed to have a high-limit and a low-limit control for temperature, VFD speed and water pressure.

According to an optional embodiment, the method proceeds to step 1409, where the pressure setpoint on the AHUs 1304-1 to 1304-N are adjusted proportionally according to the extent of the chiller operational effort. Those of ordinary skill in the art will understand that effort signifies at least the current or total power consumption of the refrigeration cycle of the chiller, including compressors, cooling tower fans, etc. In some instances, chillers may have VFDs that adjust a compressor speed of the chiller. These VFDs can often report their running speed (frequency). The VFD speed (e.g., as a percent of the maximum frequency), current (e.g., relative to full-load current) or power (e.g., relative to power at full-load current) may also be factored into the chiller effort.

In some instances, if the chilled water setpoint is controlled according to method 1400 while (for example) a temperature spike is sensed in the regulated environment 1300, the control module 105 can force one or more of the chillers 1302-1 to 1302-N into a Guard mode to protect the regulated environment 1300, where chilling is ramped up to reach maximum cooling or the temperature in the regulated environment reaches an acceptable threshold temperature by suppressing operation of the method 1400.

The method terminates at step 1410.

Figure 15:
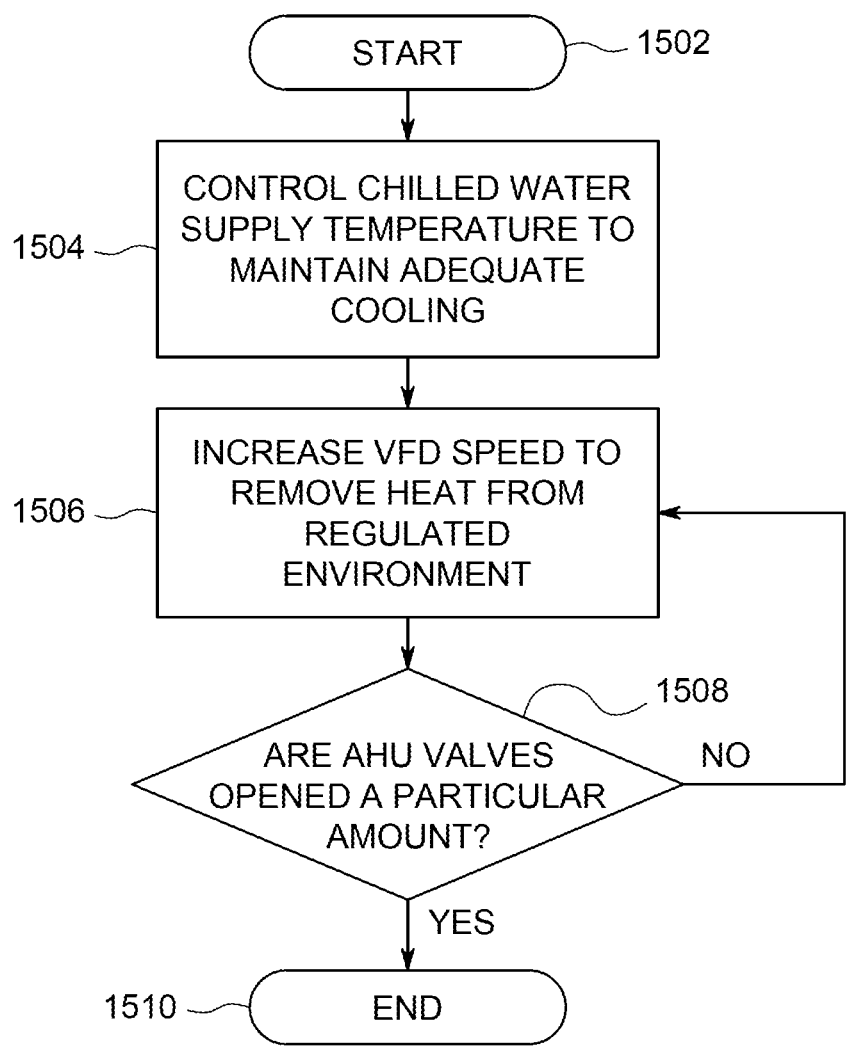
FIG. 15 is a flow diagram for another method of improving energy performance of cooling system in accordance with exemplary embodiments of the present invention.

FIG. 15 is a flow diagram for another method 1500 of improving energy performance of cooling system 101 in accordance with exemplary embodiments of the present invention.

During normal operation, a load of the cooling system 101 (i.e. servers running in regulated environment 1300) remains relatively constant. Accordingly, instead of reducing the chilled water pump VFD speed when the chilled water supply setpoint is reduced as described in method 1400, the VFD speed can be controlled to fine tune for controlling temperature of the regulated environment 1300.

The method 1500 begins at step 1502 and proceeds to step 1504. At step 1504, the control module 105 increases the chilled water pump VFD speed so that total heat removed from the regulated environment 1300 remains constant. At step 1506, the pump VFD speed is increased to remove heat from the regulated environment 1300.

The method then proceeds to step 1508 where a position of valves in each of the air handling units 1402-1 to 1402-N is measured to determine if they are opened at least a threshold amount. If the valves are open a particular amount, the method terminates at step 1510. In an exemplary embodiment, the control module 105 determines whether the valves are open ninety-five percent or more in approximately ten percent of the air handling units 1304-1 to 1304-N in order to terminate the method.

Otherwise, the method returns to step 1504 to increase pump VFD speed again. In another embodiment, as the chilled water supply temperature setpoint is decreased, VFD speed is increased proportionally (e.g., linearly) without measuring the chiller water valve position. The method terminates at step 1510.

Figure 16:
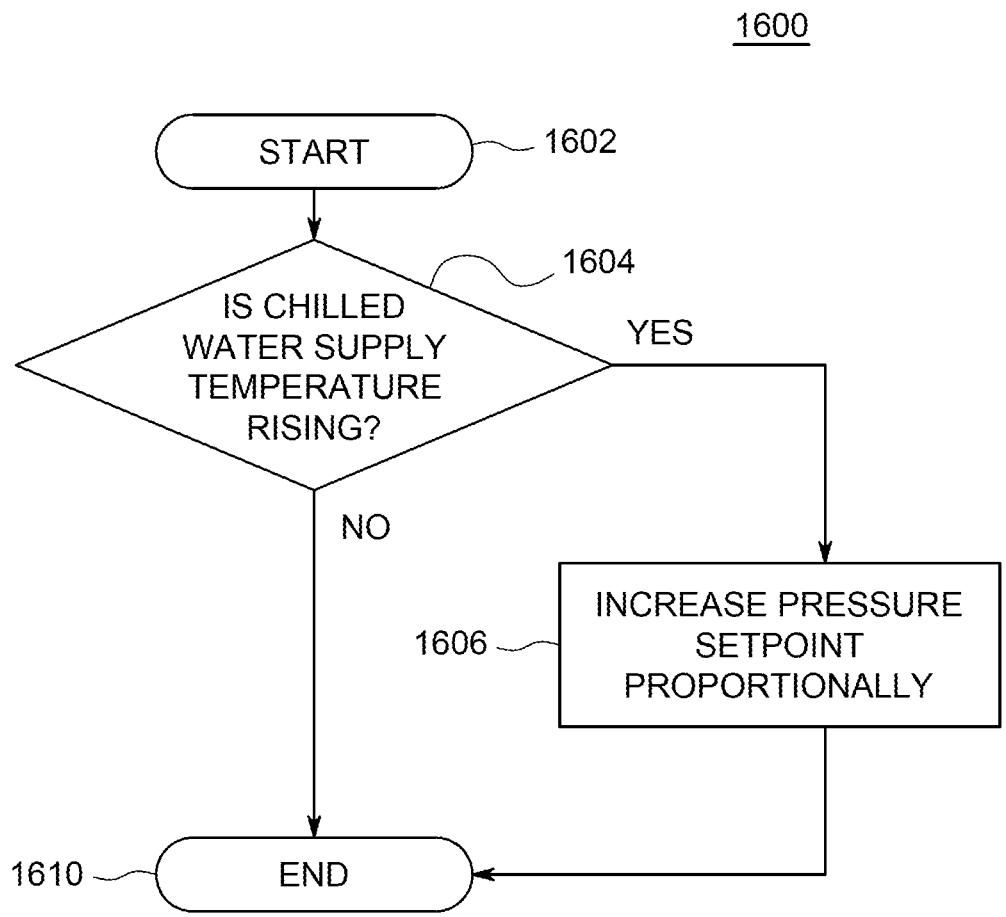
FIG. 16 is a flow diagram for another method of improving energy performance of cooling system in accordance with exemplary embodiments of the present invention.

FIG. 16 is a flow diagram for another method 1600 of improving energy performance of cooling system 101 in accordance with exemplary embodiments of the present invention.

During normal operation, a load of the cooling system 101 (i.e. servers running in regulated environment 1300) remains relatively constant. Taking this into account, the method begins at step 1602 and proceeds to step 1604, where the control module 105 determines whether the chilled water supply temperature is rising.

If the chilled water supply temperature is rising, then the method proceeds to step 1606, where the pressure setpoint is also raised proportionally to the rise in the chilled water supply temperature, without accessing or sensing valve positions. The method terminates at step 1610.

Figure 17:
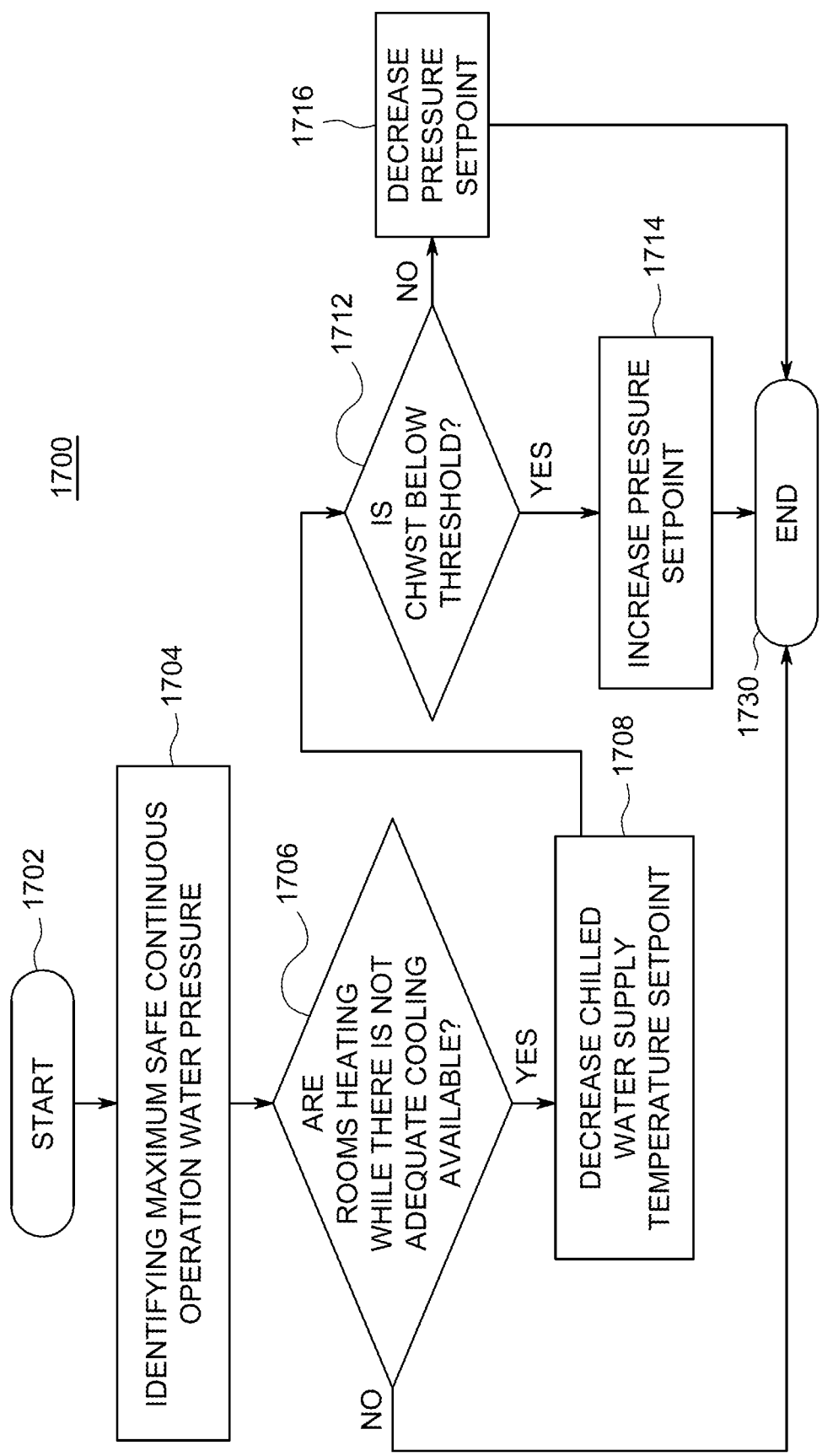
FIG. 17 is a flow diagram for another method of improving energy performance of cooling system when there is a constant load in accordance with exemplary embodiments of the present invention.

FIG. 17 is a flow diagram for another method 1700 of improving energy performance of cooling system 101 when there is a constant load in accordance with exemplary embodiments of the present invention.

The method begins at step 1702 and proceeds to step 1704, where the maximum safe continuous water pressure is determined. Method 1700 also confirms that the pressure is not so high that the VFD power consumption starts to dominate chiller power consumption.

At step 1706, the control module 105 determines whether the temperature of the regulated environments is rising while there is not adequate cooling available, for example, the discharge air temperature in the regulated environment 1300 is colder than needed. If the room is not heating, or there is adequate cooling available, the method terminates at step 1730. If 1706 is true, then the method proceeds to step 1708, where the chilled water supply temperature setpoint is decreased.

The method then proceeds to step 1712. At step 1712, if the chilled water supply temperature setpoint is below a threshold value (e.g., CHWST_SETPOINT_MAX−DELTA, where DELTA is a hysteresis threshold to avoid control chatter), the method proceeds to step 1714, where the pressure setpoint is increased. If the chilled water supply temperature setpoint is above a second threshold value (e.g., CHWST_SETPOINT_MAX−DELTA/2), then the method proceeds to step 1716, where the pressure setpoint is decreased. The method terminates at step 1730.

Figure 18:
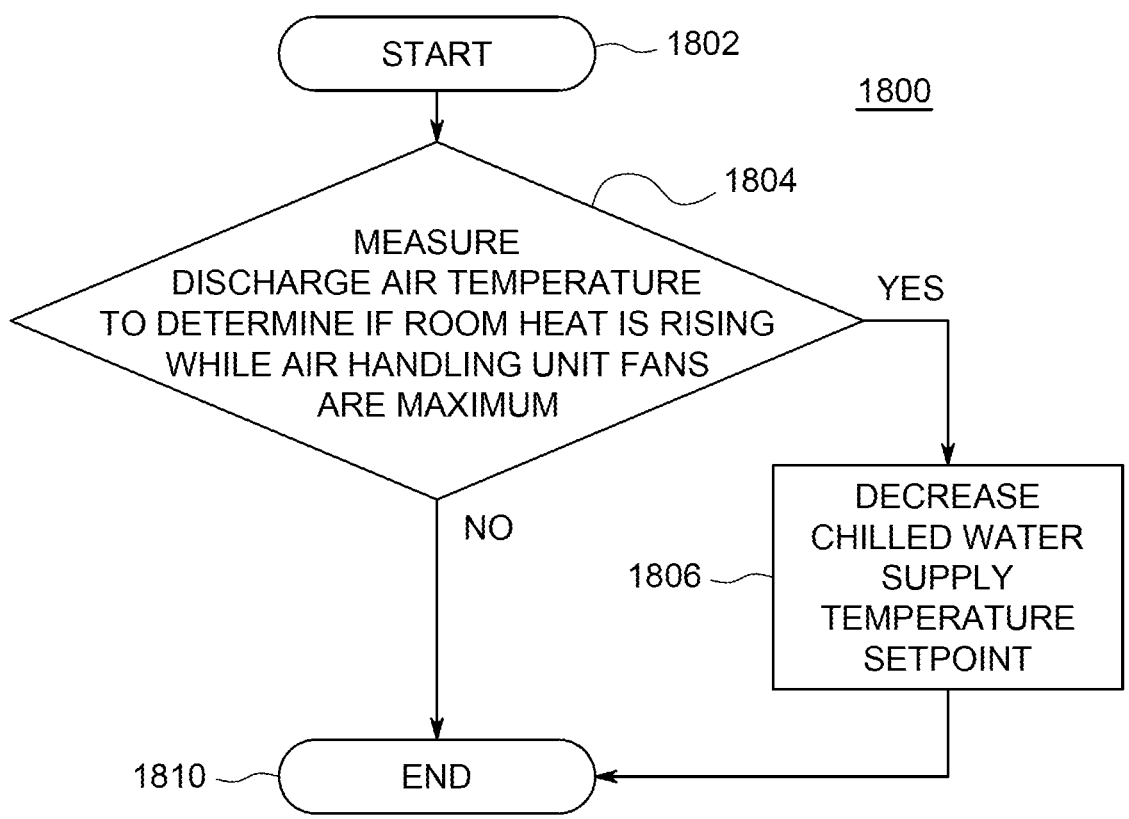
FIG. 18 is a flow diagram for a method for chiller boost mode in accordance with exemplary embodiments of the present invention.

FIG. 18 is a flow diagram for a method 1800 for chiller boost mode in accordance with exemplary embodiments of the present invention.

The method begins at step 1802 and proceeds to step 1804, where the control module 105 measures the discharge air temperature via sensors in the regulated environment 1300 to determine if the temperature is rising while AHU fans are at maximum speed. If this is true, then the method proceeds to step 1806, where the chilled water supply temperature setpoint is decreased. In this manner, an intermediate "boost mode" is created between guard mode, where temperature is reduced in the regulated environment 1300 at all costs, and normal operation of the system. The method terminates at step 1810.

Figure 19:
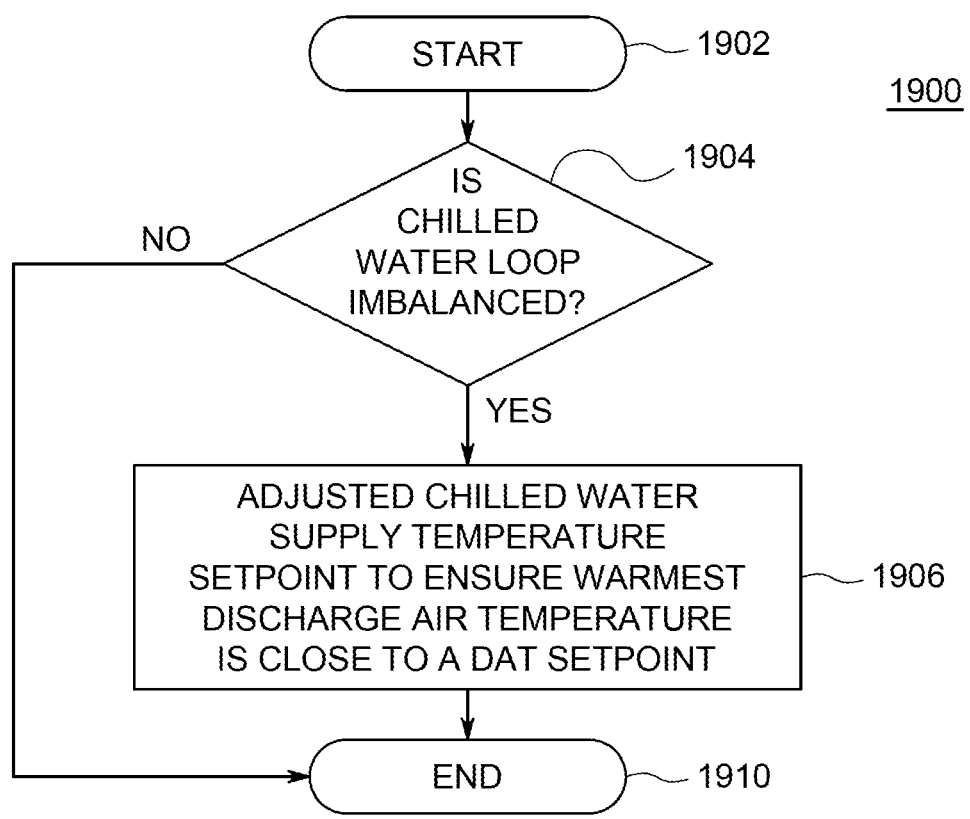
FIG. 19 is a flow diagram for a method for regulating AHUs in accordance with exemplary embodiments of the present invention.

FIG. 19 is a flow diagram for a method 1900 for regulating AHUs in accordance with exemplary embodiments of the present invention.

The method begins at step 1902 and proceeds to step 1904. At step 1904, the control module 105 determines whether the chilled water loop is imbalanced. In some embodiments, this imbalance presents itself when all of the AHU chilled water valves are open. This results in some of the AHUs 1304-1 to 130-4N to be "starved" while others are producing air that is too cold. This imbalance can be determined by measuring discharge air temperature of some or all of the AHUs 1304-1 to 1304-N (for those AHUs that can be controlled via discharge air temperature). At step 1906, the chilled water supply temperature setpoint is adjusted to ensure the warmest discharge air temperature of the AHUs 1304-1 to 1304-N is close to a DAT setpoint. For example the CHWST is adjusted so the "warmest" discharge air temperature is set to a slightly higher level on average (e.g., approximately 1.5° C.) than the discharge air temperature setpoint. Accordingly, feedback from the warmest discharge air temperature will prevent any of the AHUs 1304-2 to 1304-N from being starved and the discharge air temperature regulation of the AHUs 1304-1 to 1304-N will provide feedback to the chillers, leading to a balanced chiller loop. The method terminates at step 1910. Various elements, devices, modules and circuits are described above in association with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. An apparatus for controlling power consumption in a cooling system comprising:
   one or more processors;
   one or more sensors, coupled to the one or more processors, that monitor one or more regulated environments and one or more chillers of the cooling system, wherein the one or more chillers regulate temperature of the one or more regulated environments; and
   a storage device, coupled to the one or more processors, storing instructions that when executed by the one or more processors perform a method comprising:
   gathering readings, from the one or more sensors, corresponding to current operating conditions;
   retrieving, from a data store, previous sensor readings from the one or more sensors, wherein each sensor reading of the previous sensor readings is associated with a setting for at least one control variable of the cooling system;
   determining, based on the readings and the previous sensor readings, previous settings for a plurality of control variables of the cooling system;
   fitting, using the previous settings and costs corresponding to the previous settings, the previous settings to a function for cost minimization;
   selecting values, based on the function, for the plurality of control variables with a minimum cost as optimized control variable values; and
   applying the optimized control variable values to the plurality of control variables.

2. The apparatus of claim 1, wherein selecting values comprises:
   computing a rank of a predictor matrix used in the function for cost minimization; and
   selecting a value of a control variable that will improve the rank of the predictor matrix when the predictor matrix is rank-deficient due to a sample size of a control variable history.

3. The apparatus of claim 2, the method further comprising:
   selecting the control variable based on its priority.

4. The apparatus of claim 2, the method further comprising:
   selecting one or more of the values for the plurality of control variables with a minimum cost as optimized control variables when the predictor matrix is not rank-deficient.

5. The apparatus of claim 2, the method further comprising:
   selecting a current value of control variables based on their priority to improve the rank of the predictor matrix.

6. The apparatus of claim 1, wherein the method further comprises:
   determining a current status of the readings;
   retrieving optimized control variables corresponding to the readings; and
   generating a schedule for the plurality of control variables to be set to the optimized control variables according to the current status.

7. The apparatus of claim 1, wherein the one or more sensors are controlled to be enabled or disabled according to recorded historical data.

8. The apparatus of claim 1, wherein the plurality of control variables comprise analog control variables and Boolean control variables.

9. The apparatus of claim 8, wherein the analog control variables comprise at least discharge air temperature setpoint offset, chilled water supply temperature setpoint, chilled water deltaT setpoint, chilled water pressure setpoint, water side economizer offset, condenser offset deltaT setpoint and cooling tower approach setpoint.

10. The apparatus of claim 9, wherein the method further comprises entering a protective mode comprising:
    reducing the chilled water supply temperature setpoint towards a lower limit at a particular rate;
    increasing the chilled water pressure setpoint towards an upper limit;
    reducing an upper limit of an allowable range of the chilled water supply temperature setpoint; and
    increasing a lower limit of an allowable range of the chilled water pressure setpoint.

11. A method for controlling a cooling system, the method comprising:
    gathering readings from one or more sensors that monitor one or more regulated environments and one or more chillers of the cooling system, wherein the one or more chillers regulate temperature of the one or more regulated environments;
    retrieving, from a data store, previous sensor readings from the one or more sensors, wherein each sensor reading of the previous sensor readings is associated with a setting for at least one control variable of the cooling system;
    determining, based on the readings and the previous sensor readings, previous settings for a plurality of control variables of the cooling system;
    fitting, using the previous settings and costs corresponding to the previous settings, the previous settings to a function for cost minimization;
    selecting values, based on the function, for the plurality of control variables with a minimum cost as optimized control variable values; and
    applying the optimized control variable values to the plurality of control variables.

12. The method of claim 11, wherein selecting values comprises:
    computing a rank of a predictor matrix used in the function for cost minimization; and
    selecting a value of a control variable that will improve the rank of the predictor matrix when the predictor matrix is rank-deficient due to a sample size of a control variable history.

13. The method of claim 12, further comprising:
    selecting the control variable based on its priority.

14. The method of claim 13, further comprising:
    selecting one or more of the values for the plurality of control variables with a minimum cost as optimized control variables when the predictor matrix is not rank-deficient.

15. The method of claim 13, further comprising:
    selecting a current value of control variables based on their priority to improve the rank of the predictor matrix.

16. The method of claim 11, further comprising:
determining a current status of the readings;
retrieving optimized control variables corresponding to the readings; and
generating a schedule for the plurality of control variables to be set to the optimized control variables according to the current status.

17. The method of claim 11, wherein the one or more sensors are controlled to be enabled or disabled according to recorded historical data.

18. A method for improving energy efficiency in a cooling system, the method comprising:
defining, for one or more air handling units of the cooling system, the cooling system having one or more sensors that monitor one or more regulated environments having one or more chiller plants that regulate the temperature, an air temperature setpoint to a temperature value such that water valves in the one or more air handling units are forced to open to achieve the temperature value; and
adjusting, based on readings from the one or more sensors, at least one chiller plant setpoint of the one or more chiller plants in the cooling system that serve the one or more air handling units to achieve an air temperature within a range of the air temperature setpoint.

19. The method of claim 18, further comprising:
decreasing a chilled water supply temperature setpoint of a chiller plant in the cooling system when a temperature of the one or more regulated environments is increasing, in order to achieve a particular discharge air temperature from at least one of the one or more air handling units.

20. The method of claim 18 further comprising increasing a chilled water differential pressure setpoint of a chiller plant in the cooling system when a temperature of the one or more regulated environments is increasing, in order to achieve a particular discharge air temperature from at least one of the one or more air handling units.

* * * * *